(No Model.)
W. W. ALLEN.
COMBINATION TOOL.
No. 372,444. Patented Nov. 1, 1887.
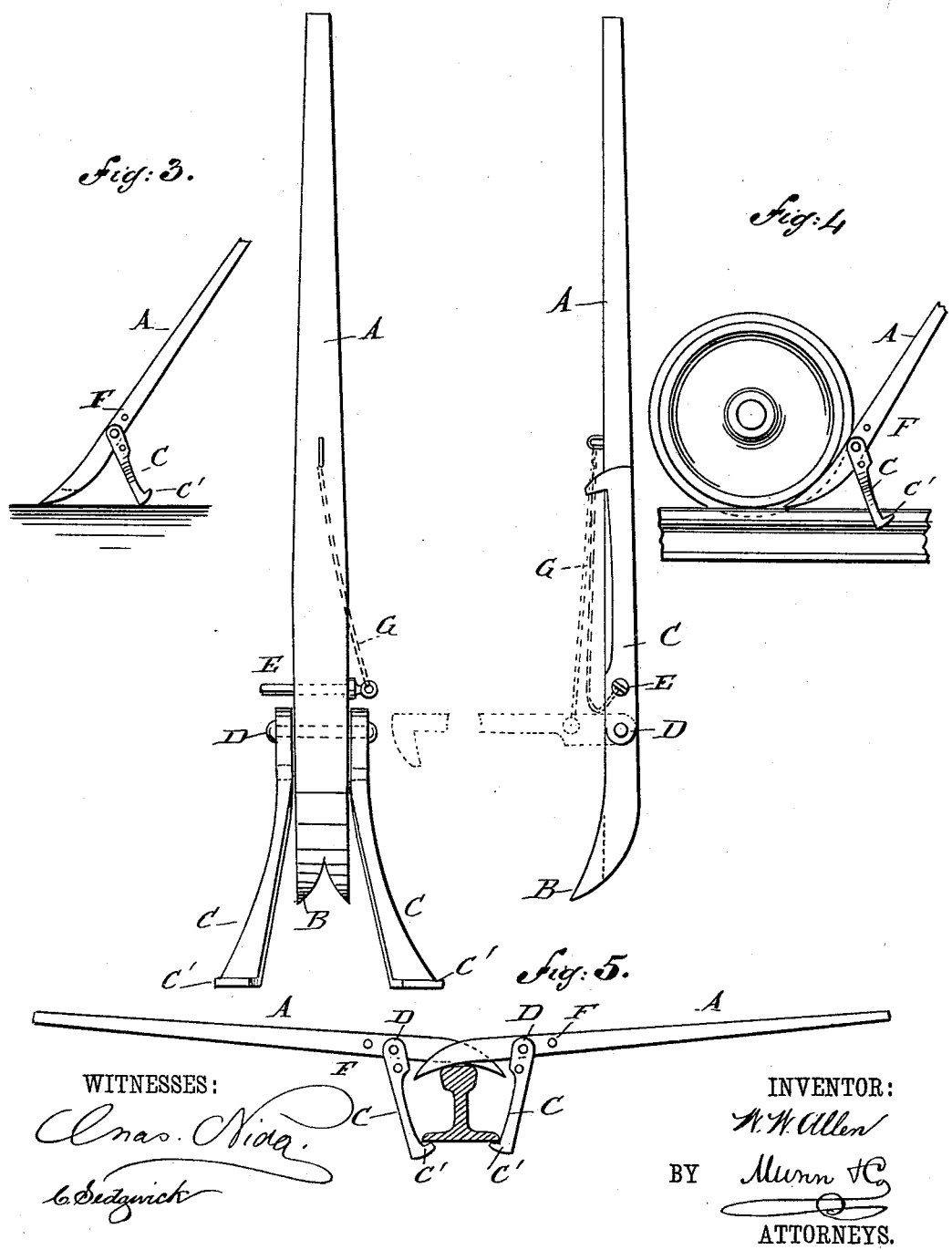
WITNESSES:
INVENTOR:
W. W. Allen
BY Munn & Co.
ATTORNEYS.

UNITED STATES PATENT OFFICE.

WILLIAM WALTER ALLEN, OF EAST PEPPERELL, MASSACHUSETTS.

COMBINATION-TOOL.

SPECIFICATION forming part of Letters Patent No. 372,444, dated November 1, 1887.

Application filed March 7, 1887. Serial No. 229,961. (No model.)

*To all whom it may concern:*

Be it known that I, WILLIAM WALTER ALLEN, of East Pepperell, in the county of Middlesex and State of Massachusetts, have invented a new and Improved Combination-Tool, of which the following is a full, clear, and exact description.

The object of my invention is to provide a new and improved combination-tool which can be very effectively used either as a cant-bar, pry-bar, pinch-bar, spike-claw, or rail-lifter.

The invention consists in the construction and arrangement of various parts and details and combination of the same, as will be fully described hereinafter, and then pointed out in the claims.

Reference is to be had to the accompanying drawings, forming a part of this specification, in which similar letters of reference indicate corresponding parts in all the figures.

Figure 1 is a front elevation of my improvement. Fig. 2 is a side elevation of the same, with the dogs in a locked position. Fig. 3 is a side elevation of the same, showing the tool used as a pry-bar. Fig. 4 is a similar view of the same, showing it applied as a pinch-bar; and Fig. 5 is a side elevation showing two bars used as a rail-lifter.

The tool consists of a claw-bar, A, provided with the usual claws, B, and of the dogs C, pivoted, one on each side of the bar A, on a pivot, D, common to both dogs C. The latter are each flared outwardly and slightly beveled on its inner edge, as shown in Fig. 1, and having its front edge curved, as shown in Fig. 2, so as to prevent the dogs from being pushed off of a close grip. On the outer end of each dog is secured a forwardly and slightly downwardly extending hook, C'.

The dogs are provided with transverse corresponding apertures, through which can be passed the pin E, also passing through an aperture, F, formed in the bar A, so as to hold the dogs C in a locked position on the bar A when the dogs are not being used, as shown in Fig. 2. The bolt or pin E is preferably hung on a chain or rope, G, secured by one end to the bar A.

The tool is used as follows: When it is desirable to withdraw spikes, then the dogs C are fastened to the bar by the pin E, as shown in Fig. 2, and the bar A can now be used as a common spike-lever or spike-claw.

The tool is used as a cant-bar by removing the pin E and swinging the dogs C into the position shown in dotted lines in Fig. 2, and then inserting the pin E again into the apertures in the dogs, so that both dogs move together as a single dog. The tool is then applied in the usual manner.

For prying purposes, the pin E is first removed from the dogs and the latter are swung to the rear of the bar A into the position shown in Fig. 3, and then the pin E is again inserted, so that the dogs move together. The latter rest with their outer ends on the ground or floor, the pivot D being thus made to act as a fulcrum for the bar A. In this position the bar can also be used as a pinch-bar, as shown in Fig. 4, the dogs forming a guide on each side of the rail.

For lifting and transporting rails I employ two bars A, one on each side of the rail, as shown in Fig. 5. Each bar A is held upside down, with its respective dogs C in the position described in reference to the cant-bar and illustrated in Fig. 5. The lower end of each bar is placed on top of the rail, while the hook C' on each dog C engages the outer edge of the base of the rail. The rail is easily lifted and held firmly in position on the two bars A when the latter are raised.

Having thus described my invention, what I claim as new, and desire to secure by Letters Patent, is—

1. A combination-tool comprising the claw-bar A and dogs pivoted on opposite sides of the said bar near its lower end, substantially as set forth.

2. A combination-tool comprising the claw-bar A, dogs pivoted to the bar at opposite sides of its lower end, and provided with apertures beyond their pivotal points, and a pin adapted to pass through said apertures and lock the two dogs together, substantially as set forth.

3. The combination, with a claw-bar, A, having the aperture F and the claws B formed on the said bar, of the dogs C C, pivoted on a common center on the said bar A, and each dog having a hook, C', at its outer end, and the pin E, adapted to pass through apertures in the said dogs C and through the corresponding aperture F in the bar A, substantially as shown and described.

4. The combination, with the claw-bar A, having the aperture F and the claws B formed on the said bar, of the dogs C C, pivoted on a common center on the said bar A, and each dog having a hook, C', at its outer end, the pin E, adapted to pass through apertures in the said dogs C and through the corresponding apertures F in the bar A, and a chain, G, secured by one end to the said bar A and by its other end to the said pin E, substantially as shown and described.

WILLIAM WALTER ALLEN.

Witnesses:
 AMOS J. SAUNDERS,
 LUCIOUS B. PUTNAM.